(12) United States Patent
Wu et al.

(10) Patent No.: US 11,485,450 B2
(45) Date of Patent: Nov. 1, 2022

(54) BICYCLE FRONT DERAILLEUR AND BICYCLE REAR DERAILLEUR

(71) Applicant: TEKTRO TECHNOLOGY CORPORATION, Changhua County (TW)

(72) Inventors: Tzung Ye Wu, Changhua County (TW); Bo-Yi Liao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 302 days.

(21) Appl. No.: 16/819,502

(22) Filed: Mar. 16, 2020

(65) Prior Publication Data

US 2020/0298934 A1  Sep. 24, 2020

Related U.S. Application Data

(60) Provisional application No. 62/820,427, filed on Mar. 19, 2019.

(30) Foreign Application Priority Data

Nov. 20, 2019 (TW) .................................. 108215365

(51) Int. Cl.
  *B62M 9/122* (2010.01)
  *B62M 9/132* (2010.01)
(52) U.S. Cl.
  CPC ............ *B62M 9/132* (2013.01); *B62M 9/122* (2013.01)

(58) Field of Classification Search
  CPC ...... B62M 9/121; B62M 9/122; B62M 9/124; B62J 43/30
  See application file for complete search history.

(56) References Cited

U.S. PATENT DOCUMENTS

| | | | |
|---|---|---|---|
| 2014/0087901 A1* | 3/2014 | Shipman | B62M 9/122 429/100 |
| 2014/0214285 A1* | 7/2014 | Wesling | F16H 59/02 701/51 |
| 2016/0339986 A1* | 11/2016 | Jordan | G08C 17/02 |
| 2017/0096185 A1* | 4/2017 | Hara | B62J 1/08 |
| 2017/0113759 A1* | 4/2017 | Watarai | B62J 43/30 |
| 2017/0197685 A1* | 7/2017 | Braedt | B62M 9/122 |

(Continued)

*Primary Examiner* — Michael R Mansen
*Assistant Examiner* — Juan J Campos, Jr.
(74) *Attorney, Agent, or Firm* — Locke Lord LLP; Tim Tingkang Xia, Esq.

(57) ABSTRACT

The disclosure provides a bicycle front derailleur including a fixed component, a chain guide, a first link, a second link, and a driving assembly. Two opposite ends of the first link are respectively disposed on the fixed component and the chain guide. The two opposite ends of the second link are respectively disposed on the fixed component and the chain guide. The driving assembly includes a driving shaft, a push component, an output gear and a power source. The push component and the output gear are fixed on the driving shaft, the power source is disposed on the fixed component and connected to the output gear, the push component is in contact with the first link, and the power source is configured to drive the push component to pivot the first link with respect to the fixed component via the output gear and the driving shaft.

1 Claim, 9 Drawing Sheets

(56) References Cited

U.S. PATENT DOCUMENTS

| | | | |
|---|---|---|---|
| 2018/0229803 A1* | 8/2018 | Wesling | B62M 25/08 |
| 2018/0274623 A1* | 9/2018 | Brown | B62M 9/126 |
| 2019/0144071 A1* | 5/2019 | Boehm | B62M 9/1242 |
| | | | 474/80 |
| 2020/0231249 A1* | 7/2020 | Ho | B62K 23/06 |

* cited by examiner

BICYCLE FRONT DERAILLEUR AND BICYCLE REAR DERAILLEUR

CROSS-REFERENCE TO RELATED APPLICATIONS

This non-provisional application claims priority under 35 U.S.C. § 119(a) on Patent Application No. 62/820,427 filed in U.S.A on Mar. 19, 2019 and on Patent Application No(s). 108215365 filed in Taiwan, R.O.C. on Nov. 20, 2019, the entire contents of which are hereby incorporated by reference.

TECHNICAL FIELD

The disclosure relates to a bicycle derailleur, more particularly to a bicycle front derailleur and a bicycle rear derailleur.

BACKGROUND

In recent years, road bikes, mountain bikes, and other types of bikes become more and more popular so that the manufacturers pay more attention on developing new and market-oriented products in order to provide costumers a better riding experience and a more stylish appearance of bicycle.

The bicycle derailleur is a device for moving a bicycle chain from a sprocket to another. Many years ago, the bicycle derailleurs were fully mechanically operated, but which is often not good enough to shift chain smoothly. Therefore, recently, electric derailleur that can smoothly shift chain by motor has largely entered the market. The motor of the derailleur can move the chain by driving a chain guide, however, the transmission of the motor to the chain guide and the arrangement of the motor with the associated components may exist many issues to be improved, thus the developers are constantly working on solving these possible issues.

SUMMARY OF THE INVENTION

The disclosure relates to a bicycle front derailleur and a bicycle rear derailleur which can facilitate the transmission of the motor as well as the arrangement of the motor with the associated components.

One embodiment of the disclosure provides a bicycle front derailleur. The bicycle front derailleur is configured to be mounted on a bicycle frame. The bicycle front derailleur includes a fixed component, a chain guide, a first link, a second link, and a driving assembly. The fixed component is configured to be mounted on the bicycle frame. Two opposite ends of the first link are respectively and pivotably disposed on the fixed component and the chain guide. The two opposite ends of the second link are respectively and pivotably disposed on the fixed component and the chain guide. The driving assembly includes a driving shaft, a push component, an output gear, and a power source. The push component and the output gear are fixed on the driving shaft, the power source is disposed on the fixed component and connected to the output gear, the push component is in contact with the first link, and the power source is configured to drive the push component to pivot the first link with respect to the fixed component via the output gear and the driving shaft.

Another embodiment of the disclosure provides a bicycle rear derailleur. The bicycle rear derailleur is configured to be mounted on a bicycle frame. The bicycle rear derailleur includes a battery assembly, a movable component, a linkage assembly, a chain guide, and a motor. The battery assembly includes a battery casing and a battery. The battery casing has a fixed portion and an accommodation portion, the fixed portion of the battery casing is configured to be mounted on the bicycle frame, and the battery is disposed in the accommodation portion of the battery casing. The linkage assembly includes a first link and a second link. An end of the first link and an end of the second link are pivotably disposed on the battery casing, and the other end of the first link and the other end of the second link are pivotably disposed on the movable component. The chain guide is pivotably disposed on the movable component. The motor is electrically connected to the battery. The motor is configured to drive the linkage assembly to move the movable component and the chain guide with respect to the bicycle frame. A pivot axis of the first link with respect to the battery casing passes the accommodation portion of the battery casing.

According to the bicycle front derailleur as discussed above, the push component and the output gear of the driving assembly are fixed on the driving shaft, the power source is disposed on the fixed component and connected to the output gear, and the push component is in contact with the first link, thus the power source can drive the push component to pivot the first link with respect to the fixed component via the output gear and the driving shaft, such that the chain guide can shift the bicycle chain to the desired position. In short, the arrangement of the output gear, the driving shaft, and the push component permits the power source to smoothly shift the chain guide.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
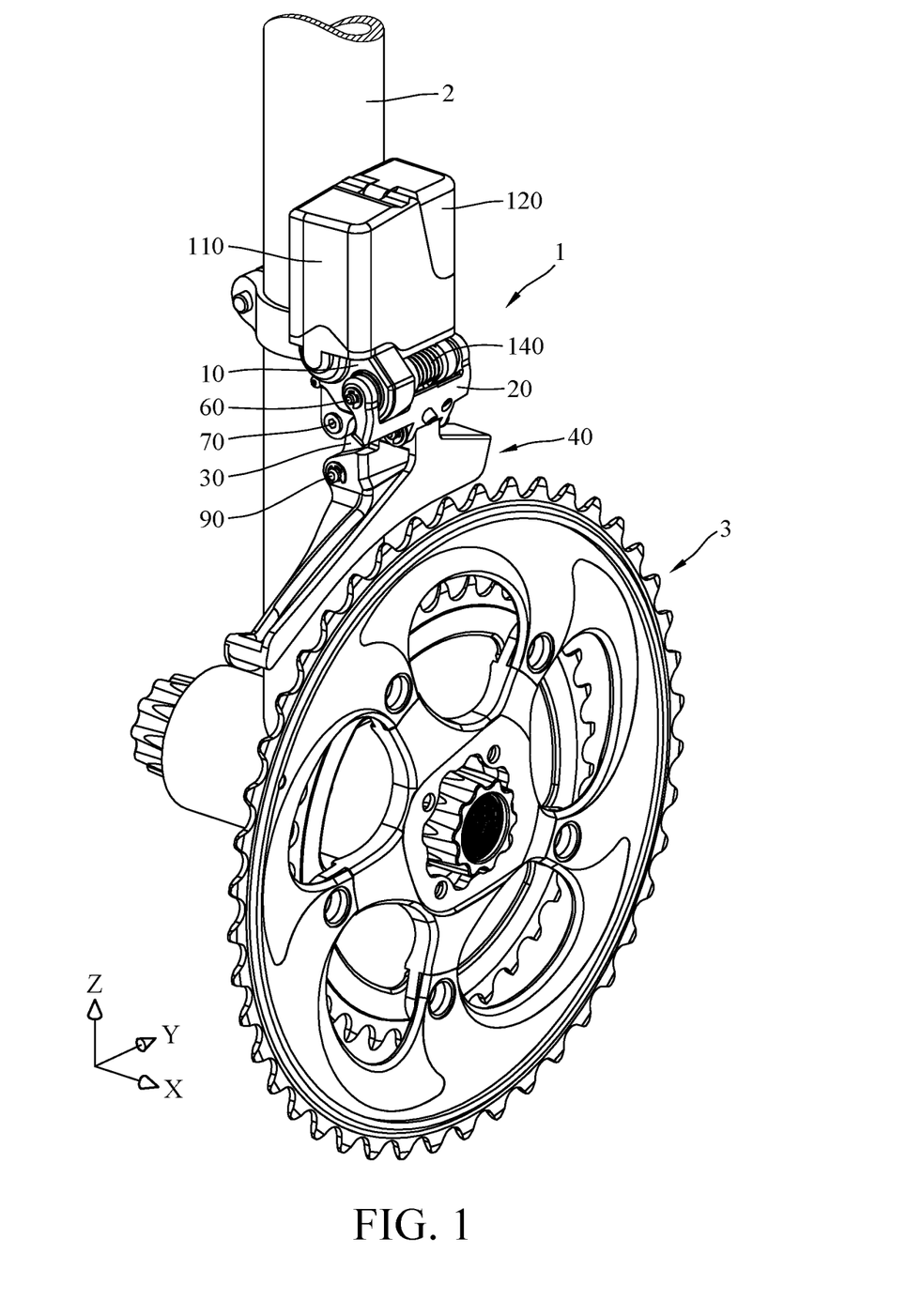
FIG. 1 is a perspective view of a bicycle front derailleur, a bicycle frame, and a front sprocket set according to a first embodiment of the disclosure.
Figure 2:
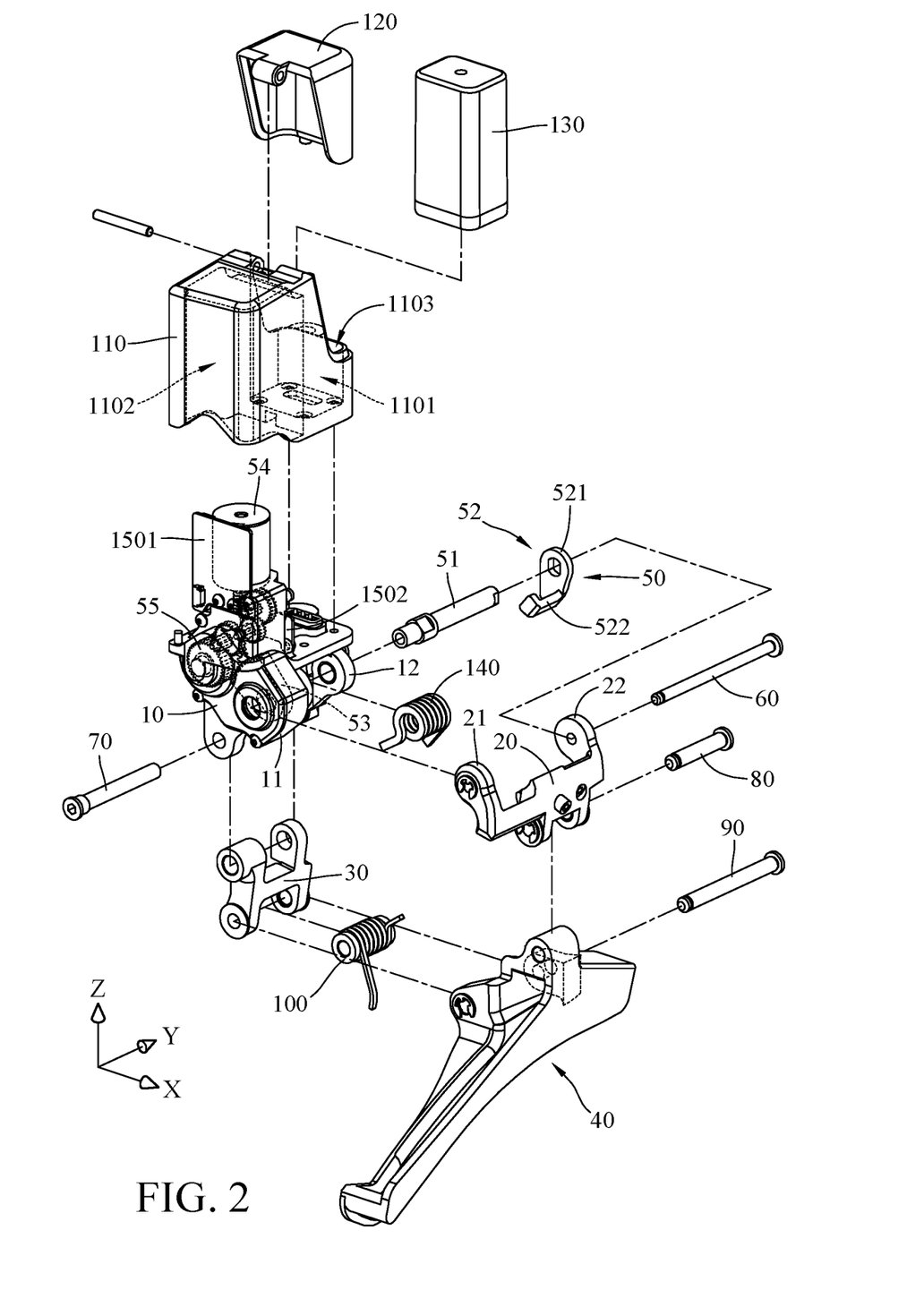
FIG. 2 is an exploded view of the bicycle front derailleur in FIG. 1.
Figure 3:
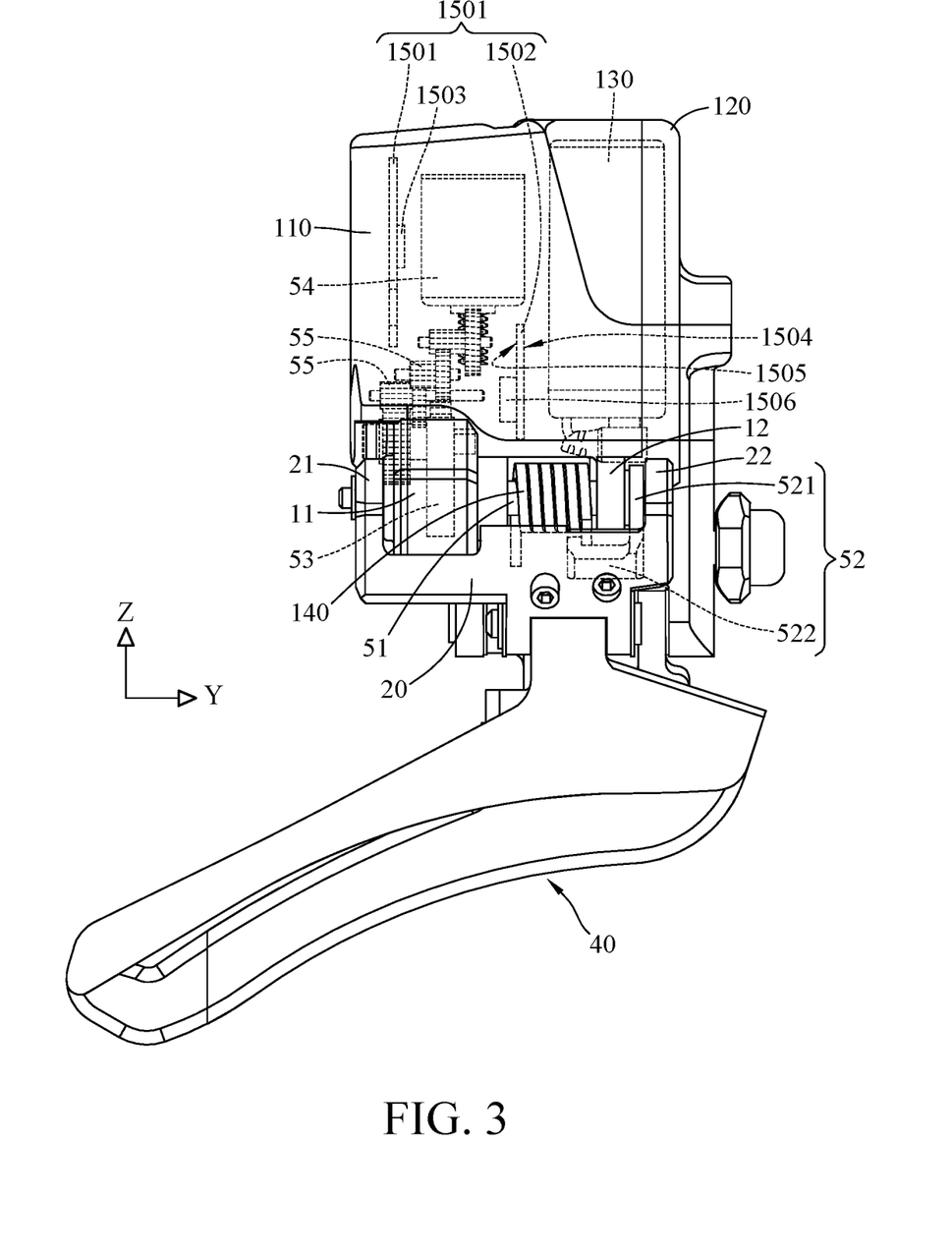
FIG. 3 is a front view of the bicycle front derailleur in FIG. 1.

Referring to FIGS. 1 to 3, where FIG. 1 is a perspective view of a bicycle front derailleur 1, a bicycle frame 2, and a front sprocket set 3 according to a first embodiment of the disclosure, FIG. 2 is an exploded view of the bicycle front derailleur 1 in FIG. 1, and FIG. 3 is a front view of the bicycle front derailleur 1 in FIG. 1.

The bicycle front derailleur 1 is configured to be mounted or installed on a bicycle frame 2 so as to correspond to a front sprocket set 3. The bicycle front derailleur 1 includes a fixed component 10, a first link 20, a second link 30, a chain guide 40, and a driving assembly 50. In this or another embodiment, the bicycle front derailleur 1 may further include four pivot shafts 60, 70, 80, and 90, a first elastic component 100, a casing 110, a battery cover 120, a battery 130, a second elastic component 140, and a circuit board assembly 150.

The fixed component 10 is configured to be mounted to the bicycle frame 2. The fixed component 10 has a first ear portion 11 and a second ear portion 12. The first link 20 has a third ear portion 21 and a fourth ear portion 22 at one end of the first link 20. The third ear portion 21 and the fourth ear portion 22 are respectively and pivotably disposed on the first ear portion 11 and the second ear portion 12 via the pivot shaft 60. The first ear portion 11 and the second ear portion 12 are located between the third ear portion 21 and the fourth ear portion 22. The first ear portion 11 is located closer to the third ear portion 21 than the second ear portion 12. An end of the second link 30 is pivotably disposed on the fixed component 10 via the pivot shaft 70. When the bicycle front derailleur 1 is mounted on the bicycle frame 2, the second link 30 is located closer to the bicycle frame 2 than the first link 20.

An end of the chain guide 40 is pivotably disposed on an end of the first link 20 away from the fixed component 10 via the pivot shaft 80, and another end of the chain guide 40 is pivotably disposed on an end of the second link 30 away from the fixed component 10 via the pivot shaft 90. The chain guide 40 is configured to shift or move a bicycle chain (not shown) among the sprockets of the front sprocket set 3. In this embodiment, the chain guide 40 is made of a single piece, and the chain guide 40 includes carbon fiber compound or glass fiber compound, thus the chain guide 40 is lighter compared with the same chain guide made of metal, thereby making the bicycle front derailleur 1 more lightweight.

The first elastic component 100 is, for example, a torsion spring. The first elastic component 100 is sleeved on the pivot shaft 90 so as to be located at a place where the second link 30 is pivotably disposed on the chain guide 40. Two opposite ends of the first elastic component 100 respectively contact or press against the second link 30 and the chain guide 40. The first elastic component 100 is configured to force the chain guide 40 to move toward the bicycle frame 2.

The casing 110 is fixed on the fixed component 10 via, for example, screws. The casing 110 has a first accommodation space 1101 and a second accommodation space 1102 separated from each other. The battery cover 120 is pivotably disposed on the casing 110 so as to cover or expose an opening 1103 of the casing 110 connected to the first accommodation space 1101. The battery 130 is removably disposed in the first accommodation space 1101. When the battery cover 120 covers the opening 1103 of the casing 110, the battery cover 120 and the casing 110 together surround the battery 130 therebetween. When the battery cover 120 exposes the opening 1103, the battery 130 is allowed to be taken out of the first accommodation space 1101.

Figure 4:
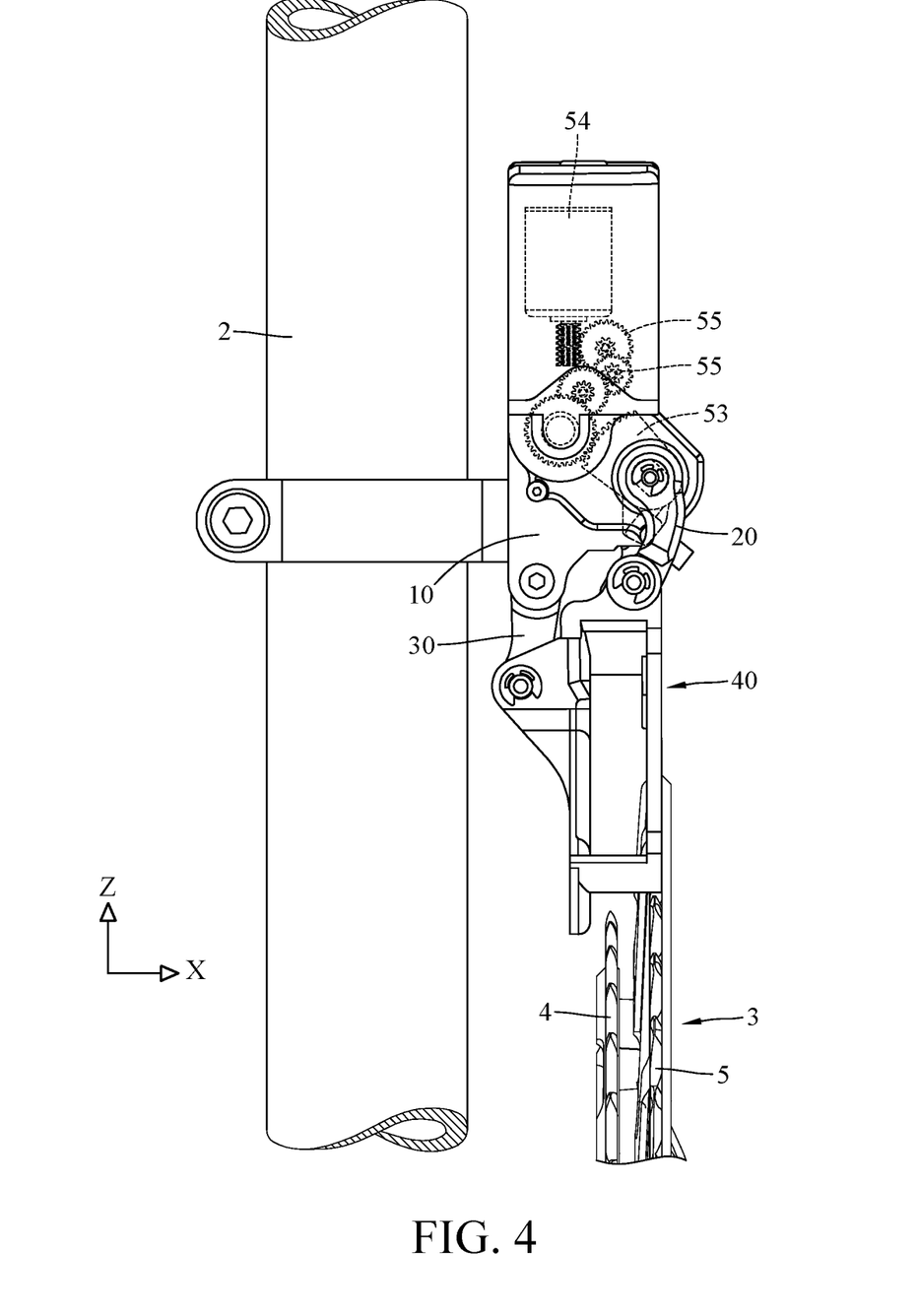
FIG. 4 is a side view of the bicycle front derailleur in FIG. 1.
Figure 5:
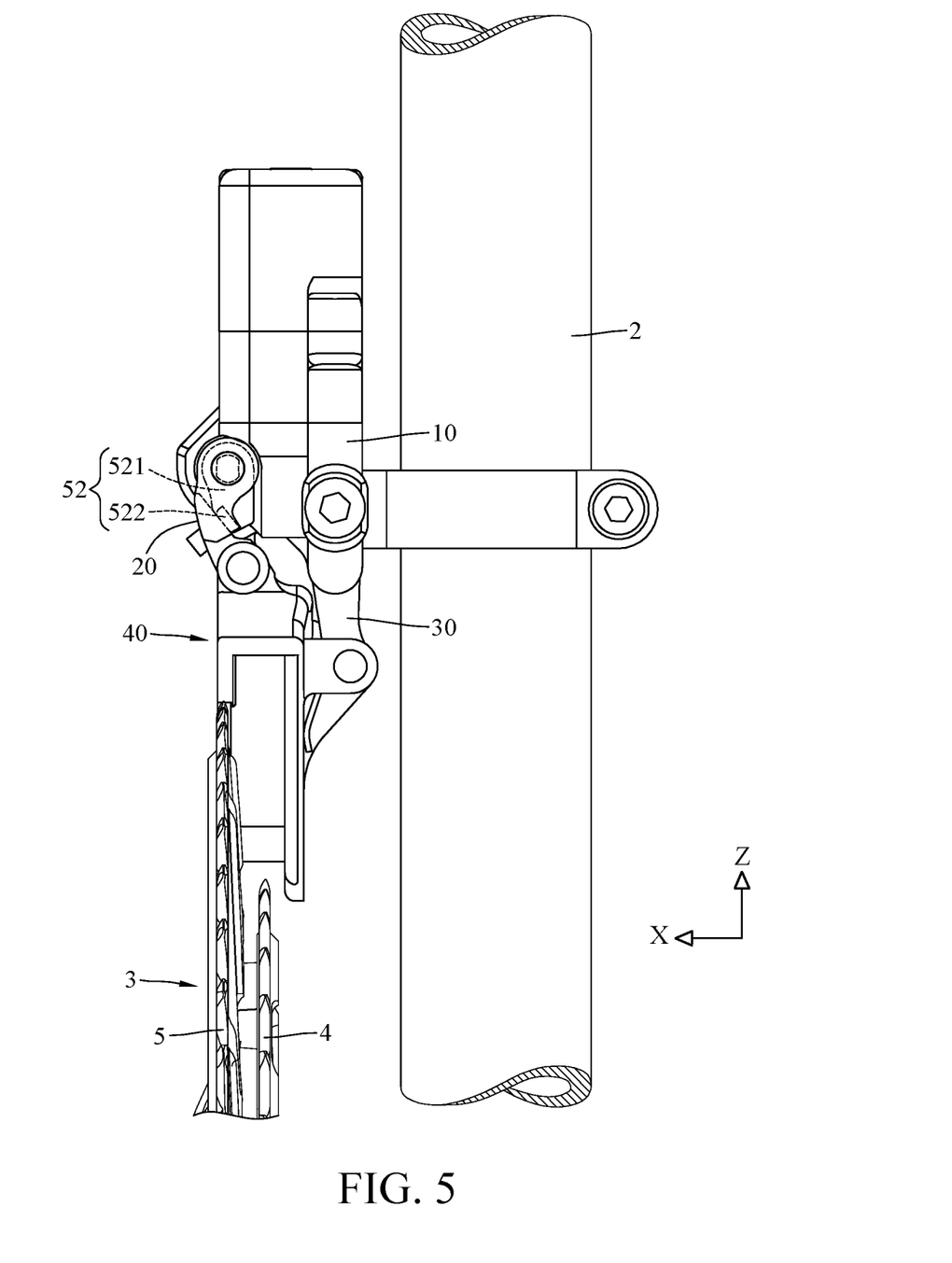
FIG. 5 is another side view of the bicycle front derailleur in FIG. 1.

Then, referring to FIG. 2 to FIG. 5, where FIG. 4 is a side view of the bicycle front derailleur 1 in FIG. 1, and FIG. 5 is another side view of the bicycle front derailleur 1 in FIG. 1.

The driving assembly 50 includes a driving shaft 51, a push component 52, an output gear 53, and a power source 54. The driving shaft 51 is sleeved on the pivot shaft 60 and is disposed through the first ear portion 11 and the second ear portion 12 of the fixed component 10. The push component 52 includes a mount portion 521 and a push portion 522 connected to each other. The mount portion 521 is fixed on the driving shaft 51 and is located between the second ear portion 12 and the fourth ear portion 22, and the push portion 522 is located aside the second ear portion 12. The second elastic component 140 is sleeved on the driving shaft 51 and is located between the first ear portion 11 and the second ear portion 12. An end of the second elastic component 140 is fixed to the first link 20, and the other end of the second elastic component 140 is in contact with the push portion 522 of the push component 52. The second elastic component 140 is configured to force the push portion 522 of the push component 52 to tightly press against the first link 20; that is, the force provided by the second elastic component 140 can make the push portion 522 of the push component 52 tightly press against the first link 20. The output gear 53 is, for example, located in the first ear portion 11 of the fixed component 10 and is fixed on the driving shaft 51. As shown in FIG. 3, the second elastic component 140 is located between the mount portion 521 of the push component 52 and the output gear 53. The power source 54 is, for example, a motor. The power source 54 is partially located in the second accommodation space of the casing 110, and the other part of the power source 54 is located in the fixed component 10 and connected to the output gear 53. In specific, the driving assembly 50 may further include a plurality of transmission gears 55 located in the fixed component 10. Each of the transmission gears 55 is connected to another. The power source 54 is connected to the output gear 53 via the transmission gears 55.

The circuit board assembly 150 is disposed in the second accommodation space 1102 of the casing 110, and the battery 130 and the power source 54 are electrically connected to the circuit board assembly 150. In this embodiment, the circuit board assembly 150 includes a first circuit board 1501 and a second circuit board 1502 separated from each other. The second circuit board 1502 is located between the first circuit board 1501 and the battery 130. The first circuit board 1501 has a control unit 1503, and the second circuit board 1502 has a first surface 1504, a second surface 1505, and an encoding unit 1506. The first surface 1504 of the second circuit board 1502 faces the battery 130. When the bicycle front derailleur 1 is mounted to the bicycle frame 2, the second surface 1505 of the second circuit board 1502 faces backwards, and the first surface 1504 of the second circuit board 1502 faces forwards; that is, the first surface 1504 of the second circuit board 1502 faces towards a direction the same as that of the bicycle moving forward, and the second surface 1505 of the second circuit board 1502 faces towards a direction opposite to that of the bicycle moving forward. The encoding unit 1506 is located at the second surface 1505 of the second circuit board 1502 and electrically connected to the control unit 1503. The encoding unit 1506 corresponds to, for example, one transmission gear 55 and is configured to transmit the position information of the said transmission gear 55 to the control unit 1503 of the first circuit board 1501.

In this embodiment, the control unit 1503 is configured to receive a shift signal transmitted from a bicycle shift lever (not shown) via a wireless manner or wired manner. The shift signal may be an upshift signal or a downshift signal. As the control unit 1503 receives the shift signal, the control unit 1503 will activate the power source 54 to move the chain guide 40 based on the position information of the transmission gear 55 transmitted by the encoding unit 1506 and thereby shifting the bicycle chain to the desired position.

Figure 6:
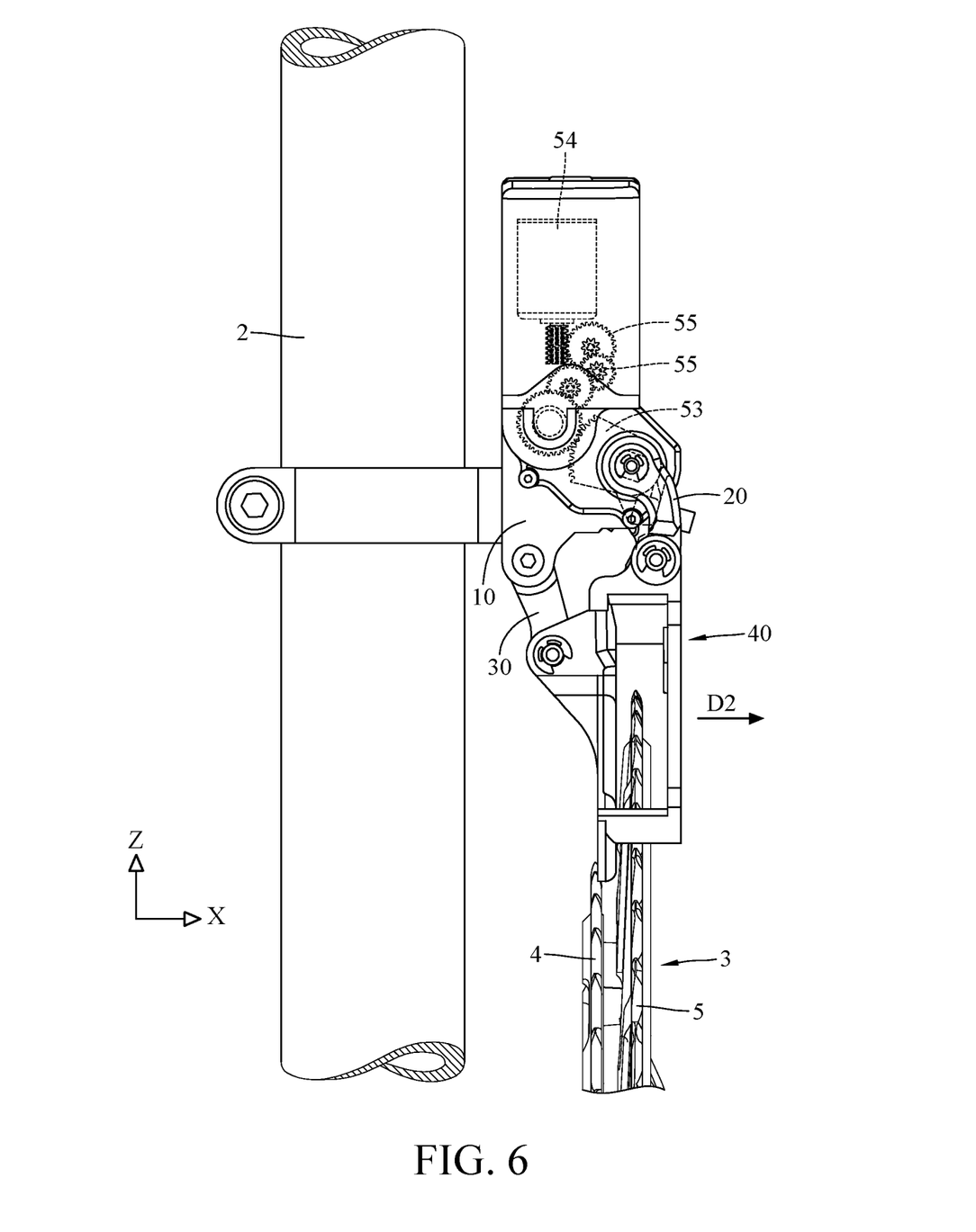
FIG. 6 is a side view of the bicycle front derailleur being upshifted.
Figure 7:
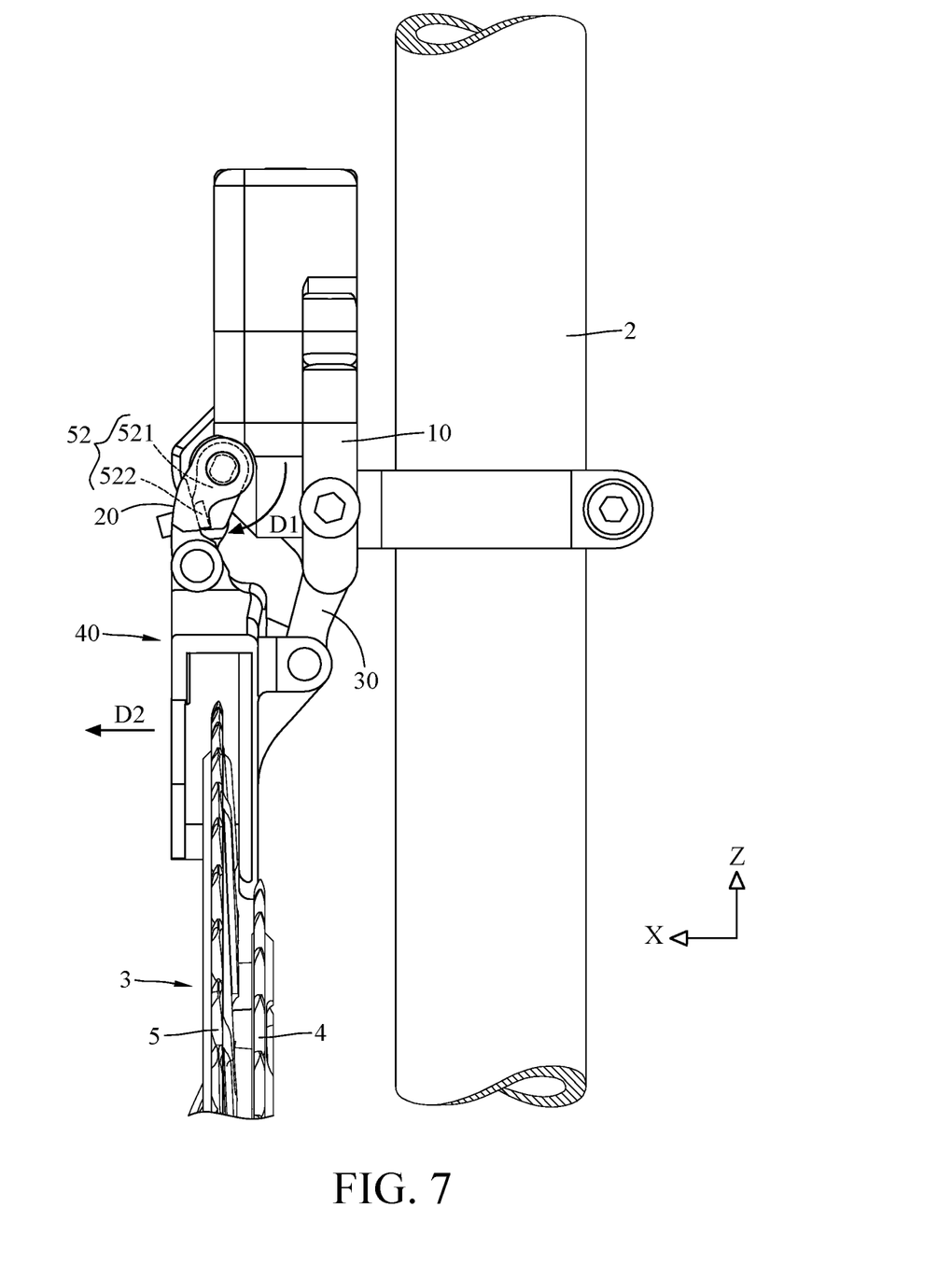
FIG. 7 is another side view of the bicycle front derailleur being upshifted.

In detail, referring to FIGS. 2, 6 and 7, where FIG. 6 is a side view of the bicycle front derailleur 1 being upshifted, and FIG. 7 is another side view of the bicycle front derailleur 1 being upshifted.

As the control unit 1503 receives an upshift signal while the chain guide 40 is corresponding to a small sprocket 4 of the front sprocket set 3, the power source 54 will drive the push component 52 to pivot along a direction D1 via the transmission gears 55, the output gear 53 and the driving shaft 51 so as to push the first link 20, such that the chain guide 40 will be moved away from the bicycle frame 2 (e.g., along a direction D2) to be a position corresponding to a large sprocket 5 of the front sprocket set 3. As a result, the bicycle chain can be shifted from the small sprocket 4 to the large sprocket 5 by the chain guide 40, thereby completing the upshifting operation of the bicycle front derailleur 1.

On the other hand, as the control unit 1503 receives a downshift signal while the chain guide 40 is corresponding to the large sprocket 5 of the front sprocket set 3, the power source 54 will drive the push component 52 to pivot along a direction opposite to the direction D1 via the transmission gears 55, the output gear 53 and the driving shaft 51 so as to forces the first link 20 to move toward the bicycle frame 2 via the second elastic component 140, such that the chain guide 40 will be moved to be a position corresponding to the small sprocket 4 along a direction opposite to the direction D2. As a result, the bicycle chain can be shifted from the large sprocket 5 to the small sprocket 4 by the chain guide 40, thereby completing the downshifting operation of the bicycle front derailleur 1. During the downshifting operation of the bicycle front derailleur 1, the first elastic component 100 also assists the chain guide 40 to move along the direction opposite to the direction D2.

According to the bicycle front derailleur as discussed above, the push component and the output gear of the driving assembly are fixed on the driving shaft, the power source is disposed on the fixed component and connected to the output gear, and the push component is in contact with the first link, thus the power source can drive the push component to pivot the first link with respect to the fixed component via the output gear and the driving shaft, such that the chain guide can shift the bicycle chain to the desired position. In short, the arrangement of the output gear, the driving shaft, and the push component permits the power source to smoothly shift the chain guide.

In addition, the chain guide is a single piece of carbon fiber compound or glass fiber compound, thus the chain guide is lighter compared with the same chain guide made of metal, thereby making the bicycle front derailleur more lightweight.

Moreover, the power source, the first circuit board, the second circuit board, and the battery are accommodated in and can be covered by a single casing and therefore presents the bicycle front derailleur a simple appearance.

Figure 8:
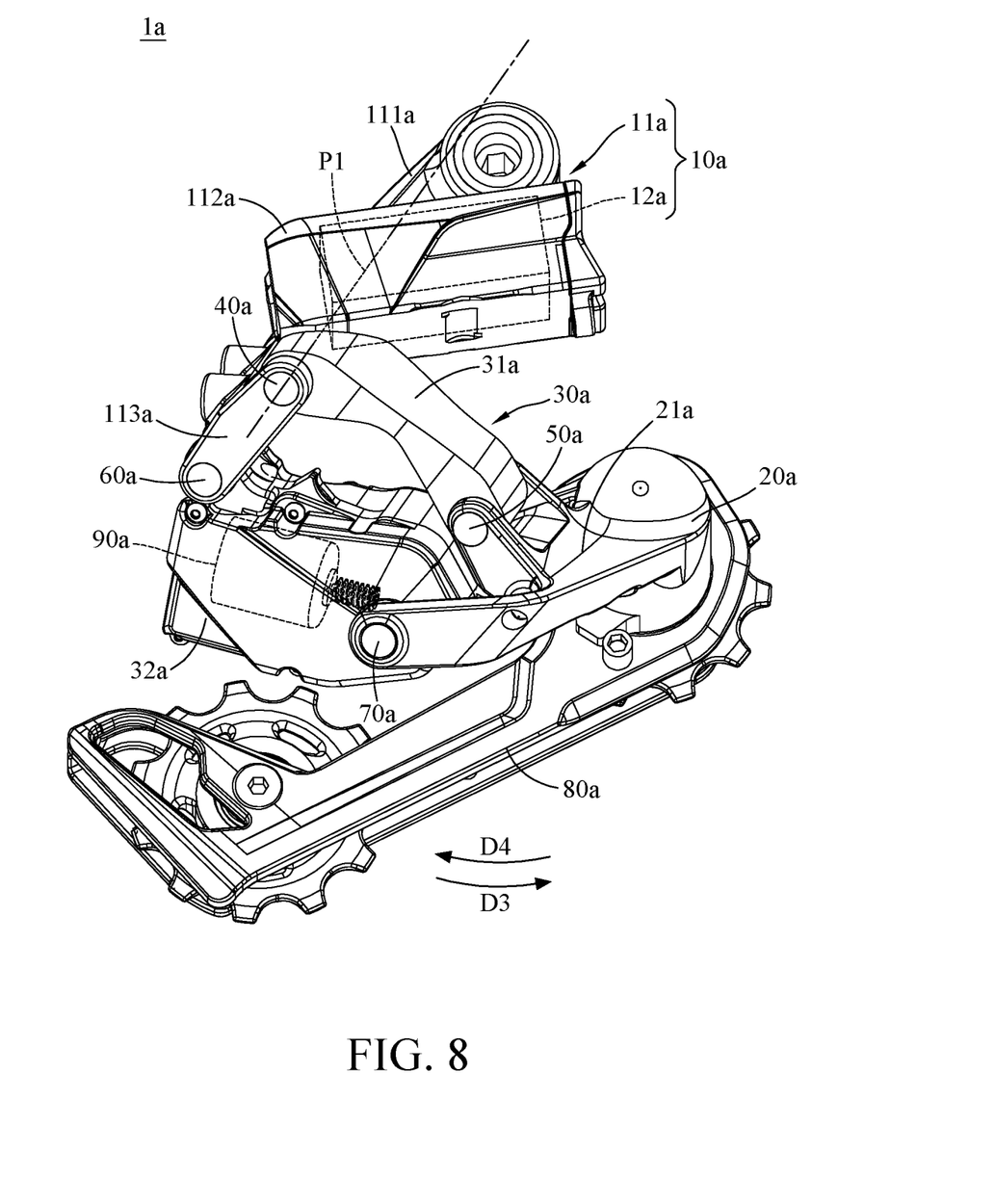
FIG. 8 is a perspective view of a bicycle rear derailleur according to a second embodiment of the disclosure.

Then, referring to FIG. 8, where FIG. 8 is a perspective view of a bicycle rear derailleur 1*a* according to a second embodiment of the disclosure.

The bicycle rear derailleur 1*a* is configured to be mounted on a bicycle frame (not shown). The bicycle rear derailleur 1*a* includes a battery assembly 10*a*, a movable component 20*a*, a linkage assembly 30*a*, four pivot shafts 40*a*, 50*a*, 60*a* and 70*a*, and a chain guide 80*a*.

The battery assembly 10*a* includes a battery casing 11*a* and a battery 12*a*. The battery casing 11*a* has a fixed portion 111*a* and an accommodation portion 112*a*. The fixed portion 111*a* of the battery casing 11*a* is configured to be mounted on the bicycle frame, such that the battery casing 11*a* is served as a fixed part of the bicycle rear derailleur 1*a*. The battery 12*a* is accommodated in the accommodation portion 112*a* of the battery casing 11*a*.

The battery casing 11*a* further has a mount portion 113*a*, and the movable component 20*a* has a mount portion 21*a*. The linkage assembly 30*a* includes a first link 31*a* and a second link 32*a*. An end of the first link 31*a* is pivotably disposed on an end of mount portion 113*a* of the battery casing 11*a* via the pivot shaft 40*a*, and the other end of the first link 31*a* is pivotably disposed on an end of the mount portion 21*a* of the movable component 20*a* via the pivot shaft 50*a*. An end of the second link 32*a* is pivotably disposed on the other end of the mount portion 113*a* of the battery casing 11*a* via the pivot shaft 60*a*, and the other end of the second link 32*a* is pivotably disposed on the other end of the mount portion 21*a* of the movable component 20*a* via the pivot shaft 70*a*. The chain guide 80*a* is pivotably disposed on the movable component 20*a* and configured to guide a bicycle chain (not shown).

As shown in FIG. 8, the first link 31*a* has a pivot axis P1 passing the accommodation 112*a* of the battery casing 11*a*. Furthermore, the pivot axis P1 of the first link 31*a* also passes the accommodation 112*a* of the battery casing 11*a* and the battery 12*a* located inside the accommodation portion 112*a*.

The bicycle rear derailleur 1*a* further includes a motor 90*a*. The motor 90*a* is disposed in the second link 32*a*. The battery 12*a* is electrically connected to the motor 90*a* so as to provide electricity to the motor 90*a*. The motor 90*a* can drive the second link 32*a* to pivot the first link 31*a* and the second link 32*a* via transmission gears (not shown) connected to one another, such that the movable component 20*a* and the chain guide 80*a* can be moved with respect to the bicycle frame so as to shift the bicycle chain among different sprockets of a rear sprocket set (not shown).

Figure 9:
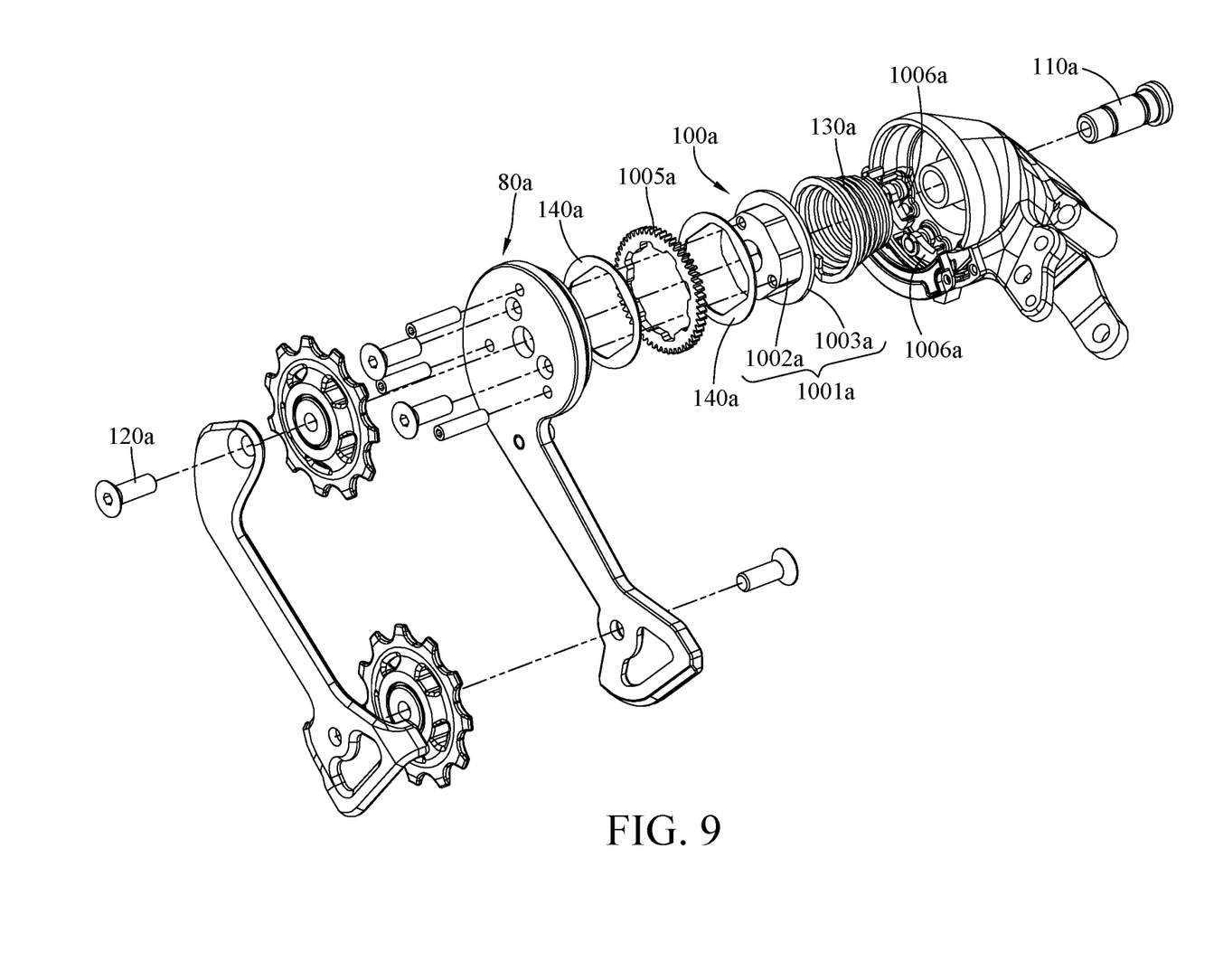
FIG. 9 is a partial exploded view of the bicycle rear derailleur in FIG. 8.

Then, referring to FIGS. 8 and 9, wherein FIG. 9 is a partial exploded view of the bicycle rear derailleur 1*a* in FIG. 8.

In this embodiment, the bicycle rear derailleur 1*a* further includes a resistance applying assembly 100*a*, a pivot shaft 110*a*, a fastener 120*a*, and a torsion spring 130*a*.

The pivot shaft 110*a* and the fastener 120*a* are respectively disposed through the movable component 20*a* and the chain guide 80*a*, and the fastener 120*a* is screwed into the pivot shaft 110*a*, such that the chain guide 80*a* is pivotable with respect to the movable component 20*a*. The resistance applying assembly 100a is connected to and located between the movable component 20a and the chain guide 80a.

In detail, the resistance applying assembly 100a includes a seat 1001a, a first engagement component 1005a, and a plurality of second engagement components 1006a. The seat 1001a includes a seat portion 1002a and a flange portion 1003a. The seat portion 1002a is fixed to a side of the chain guide 80a close to the movable component 20a via screws. The pivot shaft 110a is disposed through the movable component 20a and the seat portion 1002a of the seat 1001a, and the fastener 120a is disposed through the chain guide 80a and is screwed into the pivot shaft 110a. The flange portion 1003a is located at a side of the seat portion 1002a away from the chain guide 80a and radially protrudes from the seat portion 1002a.

The first engagement component 1005a is, for example, a ratchet wheel. The seat portion 1002a of the seat 1001a is disposed through the first engagement component 1005a, and the first engagement component 1005a is located between and clamped by the flange portion 1003a and the chain guide 80a. The seat 1001a, the first engagement component 1005a, and the chain guide 80a are tightly fixed together, and the seat 1001a, the first engagement component 1005a, and the chain guide 80a can be pivoted with respect to the movable component 20a via the pivot shaft 110a. In this embodiment, the bicycle rear derailleur 1a may further include two washers 140a sleeved on the seat portion 1002a of the seat 1001a, where one of the washers 140a is located between the first engagement component 1005a and the chain guide 80a, and the other washer 140a is located between the flange portion 1003a and the first engagement component 1005a. The washers 140a are used to increase the friction among the flange portion 1003a, the chain guide 80a, and the first engagement component 1005a. It is noted that the quantity of the washers is not restricted; in some other embodiments, the bicycle rear derailleur may have only one washer located between the first engagement component and the chain guide or between the flange portion and the first engagement component.

The second engagement components 1006a are, for example, pawls. The second engagement components 1006a are pivotably disposed on a side of the movable component 20a close to the chain guide 80a. The second engagement components 1006a are spaced apart from each other. The second engagement components 1006a are configured to be engaged with the first engagement component 1005a. When the second engagement components 1006a are engaged with the first engagement component 1005a, the friction among the first engagement component 1005a, the chain guide 80a, and the flange portion 1003a is larger enough to prevent the chain guide 80a from pivoting along a direction D3, thereby preventing the bicycle chain from falling off from the bicycle rear sprocket set.

An end of the torsion spring 130a is fixed to a side of the movable component 20a close to the chain guide 80a, and the other end of the torsion spring 130a is fixed to the seat 1001a. The torsion spring 130a is configured to force the chain guide 80a to pivot along a direction D4 opposite to the direction D3 via the seat 1001a. When there is no external force applied on the chain guide 80a, the torsion spring 130a forces the chain guide 80a to tighten the bicycle chain, thereby preventing the bicycle chain from falling off from the bicycle rear sprocket set.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, configured to be mounted on a bicycle frame, comprising:
   a battery assembly, comprising a battery casing and a battery, wherein the battery casing has a fixed portion, an accommodation portion, and a mount portion, the fixed portion of the battery casing is configured to be mounted on the bicycle frame, and the battery is disposed in the accommodation portion of the battery casing;
   a movable component;
   a linkage assembly, comprising a first link and a second link, wherein an end of the first link and an end of the second link are pivotably disposed on the mount portion of the battery casing, and the other end of the first link and the other end of the second link are pivotably disposed on the movable component;
   a chain guide, pivotably disposed on the movable component; and
   a motor, electrically connected to the battery, wherein the motor is configured to drive the linkage assembly to move the movable component and the chain guide with respect to the bicycle frame;
   wherein a pivot axis of the first link with respect to the battery casing passes the accommodation portion of the battery casing and the battery.

* * * * *